June 30, 1931.     L. M. SHERIDAN     1,812,176
VARIABLE SPEED MECHANISM
Filed May 3, 1930

INVENTOR.
L. M. Sheridan
BY E. J. Featherstonhaugh
ATTORNEY.

Patented June 30, 1931

1,812,176

UNITED STATES PATENT OFFICE

LESLIE MITCHELL SHERIDAN, OF COPPERCLIFF, ONTARIO, CANADA

VARIABLE SPEED MECHANISM

Application filed May 3, 1930. Serial No. 449,585.

This invention relates to a variable speed mechanism, as described in the present specification and illustrated in the accompanying drawings which form part of same.

The invention consists essentially of the novel features of construction pointed out broadly and specifically in the claim for novelty following a description containing an explanation in detail of an acceptable form of the invention.

The objects of this invention are to construct a centrifugal speed changing device whereby the torque exerted on the driven shaft will automatically vary the gear ratio between the driven shaft and the driving shaft and thus maintain a constant torque to be exerted on the driving shaft from the prime mover, thus creating a device particularly adapted for use on motor vehicles and the like; to facilitate the transmission of power where the load varies constantly and yet enable the prime mover to carry a steady load, and generally to provide a speed changing device simple in operation and construction and yet capable of transmitting ample power for its size and economical as to its manufacture and upkeep.

Figure 1:
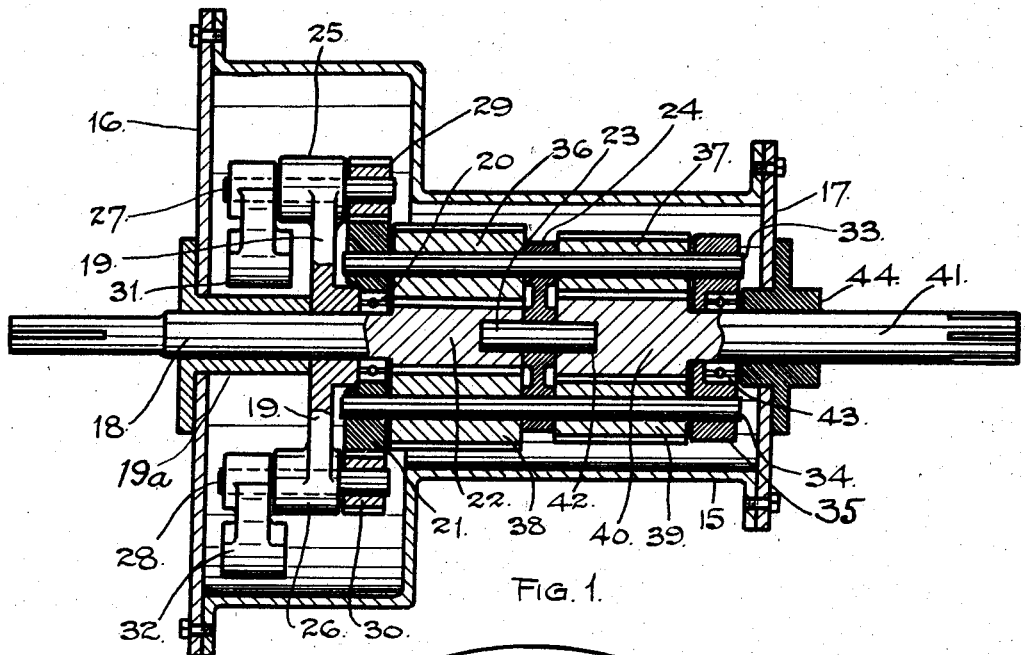

In the drawings, Figure 1 is a sectional plan view of the device.

Figure 2:
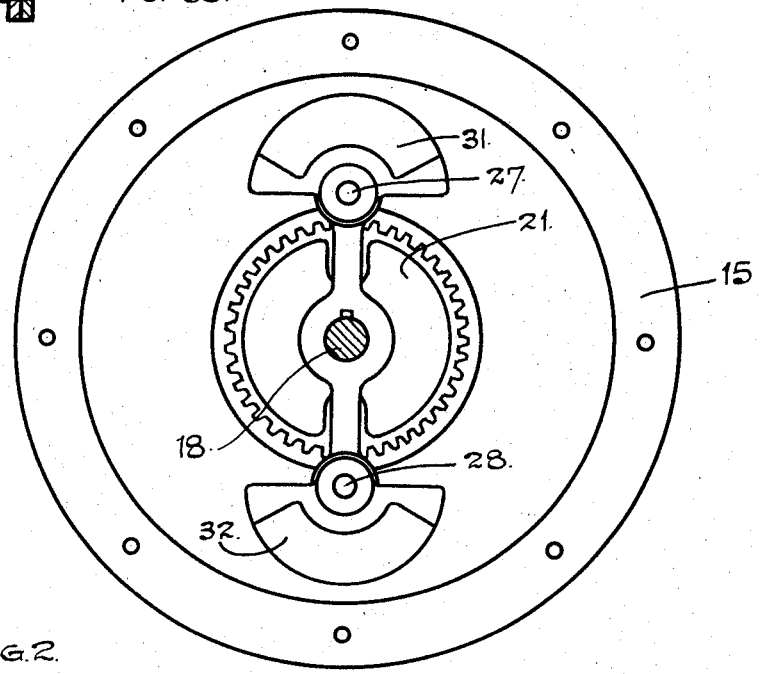

Figure 2 is an end elevation taken from the driving end with the cover removed showing the interior.

Like numerals of reference indicate corresponding parts in the various figures.

Referring to the drawings the numeral 15 indicates a casing closed at the ends by the cover plate 16 and 17 through one end of which projects the drive shaft 18 which is journalled in the bearing 19a secured to the end plate 16.

The drive shaft 18 has a frame 19 fixedly secured thereto and rotates on the ball race 20 which is secured within the hub of the large spur gear 21. To the extremity of the drive shaft is secured the gear 22 which is recessed centrally to receive the stub shaft 23 projecting from the center of the plate 24.

The frame 19 has the enlarged bosses 25 and 26 at the extremities which form bearings for the short shafts 27 and 28. To one end of these shafts is secured the gears 29 and 30 which mesh with the large gear 21 and rotate therewith. To the opposite ends of the shafts are secured the eccentric balance weights 31 and 32. It can therefore be seen that on the rotation of the large gear the balance weights will rotate around the axis of the shafts 27 and 28.

The shafts 33 and 34 are journalled in the large gear 21, the center plate 24 and the end plate 35. The shaft 33 having the gears 36 and 37 secured thereon and the shaft 34 having the gears 38 and 39 secured thereon.

The gears 36 and 28 mesh with the gear 22 secured to the driving shaft and transmit the drive through the shafts 33 and 34 to the gears 37 and 39 which mesh with the gear 40 secured to the extremity of the driven shaft 41. The gear 40 having a centrally disposed recess into which is introduced the stub shaft 42 projecting from the center of the plate 24.

The driven shaft 41 is encircled by the ball race 43 which is secured in a recess provided in the face of the end plate 35 and is journalled in the bearing 44 which is secured to the face of the cover plate 16.

It will thus be seen that the entire rotating parts of the device are enclosed by the casing 15 which is oil tight and may be provided with arms for securing the device in the chassis or frame of a motor vehicle or the like. The ends of the driving shaft 18 and the driven shaft 41 may either be keywayed or splined whichever may be found advantageous to accommodate the coupling or prime mover.

In the operation of this invention the drive shaft 18 is rotated which in turn rotates the gear 22, this gear coacting with the gears 36 and 38 which are secured to the shafts 33 and 34 and rotate the gears 37 and 39, these gears coacting with the gear 40 to rotate the driven shaft 41. When, however the load or torque on the driven shaft 41 becomes so great as to cause the shaft 41 and the gear 40 to lose speed, the gears 37 and 39 and the gears 36 and 38 naturally slow up and being assembled with the gear 21, the drive will be backwards and the gears 36 and 38 and 37 and 39 will travel around the gears 22 and 40 respectively at an increasing velocity and the gears 36 and 38 will carry the gear 21 in rotation and operate the gears 29 and 30 and rotate the eccentric balance weights 31 and 32. These balance weights are journalled in the ends of the frame 19 which is fixedly secured to the driving shaft and the weights rotate in a plane at right angles to the axis of the driving and driven shafts and on rotation exert a series of retarding impacts or impulses towards this axis. It will therefore be seen that any increase in torque on the driven shaft will have the effect of causing the planetary gears to increase their velocity in travelling around the sun wheels 22 and 40 which in turn increases the rotative speed of the eccentric balance weights. This has the effect of increasing the number of impulses towards the axis of the mechanism which coupled with the forces caused by the centrifugal action of the rotating weights forms a counter balancing movement in the opposite direction to the torque acting on the driven shaft, thereby allowing the planetary gear mechanism to adjust itself to a suitable gear ratio in proportion to the torque. Thus in the event of the mechanism being used in place of the usual automobile gear transmission the starting torque would be very high and the balance weights on starting would rotate at a high velocity but as soon as the machine got started this high torque would fall off and consequently the velocity of the balance weights would also decrease until when running on the level they would have hardly any movement at all, the natural inclination of the balance weights being to stay in an outward position as illustrated in Figure 2 and the force required to overcome this centrifugal action of the balance weights is sufficient to balance any ordinary load imposed on the driven shaft under normal conditions.

The balance weights need not necessarily be in the position illustrated in the drawings, they can be either secured to the shafts 33 and 34 or geared directly to the gears 36, 37, 38 and 39 and the stationary casing 15 may be attached to or form part of the rotating cage in which the planetary gears are journalled and rotate therewith without changing the scope of this invention.

What I claim is:

A variable speed mechanism comprising a casing having covered plates closing in the ends thereof, bearing members in each of said covered plates, a driving shaft journalled in one of said bearing members, a frame fixedly secured to said driving shaft and having enlarged bosses forming bearing members, a spur gear mounted on said driving shaft, a main gear secured to the extremity of said driving shaft, a pair of short shafts journalled on said frame and having at their other ends eccentric balance weights, a driven shaft journalled in the other of said covered plates and having a gear at its inner extremity, a pair of shafts journalled at one end of said spur gear and at the other end to the end plate, and another gear journalled on said pair of shafts intermeshing with said main gears.

Signed at Toronto, Canada, this 3rd day of April, 1930.

LESLIE MITCHELL SHERIDAN.